(12) United States Patent
Branover et al.

(10) Patent No.: US 8,959,372 B2
(45) Date of Patent: Feb. 17, 2015

(54) DYNAMIC PERFORMANCE CONTROL OF PROCESSING NODES

(71) Applicant: Advanced Micro Devices, Inc., Sunnyvale, CA (US)

(72) Inventors: Alexander Branover, Chestnut Hill, MA (US); Maurice B Steinman, Marlborough, MA (US); William L Bircher, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 13/919,306

(22) Filed: Jun. 17, 2013

(65) Prior Publication Data

US 2013/0283078 A1    Oct. 24, 2013

Related U.S. Application Data

(63) Continuation of application No. 12/868,996, filed on Aug. 26, 2010, now Pat. No. 8,484,498.

(51) Int. Cl.
    *G06F 1/00*           (2006.01)
    *G06F 1/32*           (2006.01)

(52) U.S. Cl.
    CPC ............ *G06F 1/3215* (2013.01); *G06F 1/3203* (2013.01); *G06F 1/324* (2013.01); *G06F 1/3296* (2013.01); *Y02B 60/1217* (2013.01); *Y02B 60/1285* (2013.01)
    USPC ........................................................ 713/323

(58) Field of Classification Search
    CPC .................................. G06F 1/26; G06F 1/30
    USPC ................................................. 713/300–340
    See application file for complete search history.

(56) References Cited

U.S. PATENT DOCUMENTS

7,111,179 B1    9/2006    Girson et al.
7,254,721 B1    8/2007    Tobias et al.
(Continued)

FOREIGN PATENT DOCUMENTS

| | | |
|---|---|---|
| JP | 2002366252 | 12/2002 |
| JP | 2008511912 | 4/2008 |
| JP | 2009069017 | 4/2009 |
| JP | 2010081752 | 4/2010 |
| JP | 2011515776 | 5/2011 |
| WO | 2007103051 | 9/2007 |

OTHER PUBLICATIONS

Whitepaper: 'Advanced configuration and Power Interface Specification', Hewlett-Packard Inc.; Jun. 16, 2009, pp. 19-23.
(Continued)

*Primary Examiner* — Raymond Phan
(74) *Attorney, Agent, or Firm* — Meyertons Hood Kivlin Kowert & Goetzel; Erik A. Heter

(57) ABSTRACT

An apparatus and method for performance control of processing nodes is disclosed. In one embodiment, a system includes a processing node and a power management unit configured to, for each of a plurality of time intervals, monitor an activity level of the processing node, cause the processing node to operate at a high operating point during one successive time interval if the activity level in the given interval is greater than a high activity threshold, operate at a low operating point at least one successive time interval if the activity level is less than a low activity threshold, or enable operating system software to cause the processing node to operate at one of one or more predefined intermediate operating points of the plurality of operating points if the activity level is less than the high activity threshold and greater than the low activity threshold.

17 Claims, 10 Drawing Sheets

(56) References Cited

U.S. PATENT DOCUMENTS

| | | | |
|---|---|---|---|
| 7,596,709 | B2 | 9/2009 | Cooper et al. |
| 7,917,787 | B2 | 3/2011 | Jahagirdar |
| 7,966,506 | B2 | 6/2011 | Bodas |
| 7,979,699 | B2 | 7/2011 | Buch |
| 8,010,822 | B2 | 8/2011 | Marshall et al. |
| 8,484,498 | B2 * | 7/2013 | Branover et al. ............ 713/323 |
| 2006/0282692 | A1 | 12/2006 | Oh |
| 2009/0150695 | A1 | 6/2009 | Song et al. |
| 2009/0199020 | A1 | 8/2009 | Bose et al. |
| 2009/0235108 | A1 | 9/2009 | Gold et al. |
| 2009/0271646 | A1 | 10/2009 | Talwar et al. |
| 2010/0023790 | A1 | 1/2010 | Cooper et al. |
| 2010/0153763 | A1 | 6/2010 | Sood |
| 2010/0162023 | A1 | 6/2010 | Rotem et al. |
| 2010/0332856 | A1 | 12/2010 | Song |
| 2011/0055609 | A1 | 3/2011 | Karayi et al. |
| 2012/0066535 | A1 | 3/2012 | Naffziger |

OTHER PUBLICATIONS

Isci, et al, 'Live, Runtime Phase Monitoring and Prediction on Real Systems with Application to Dynamic Power Management', 2006, pp. 12, Micro 39 Proceedings of the 39th Annual IEEE/ACM International Symposium on Microarchitecture.

International Search Report and Written Opinion dated Nov. 18, 2011 for PCT/US2011/049171; 17 pages.

Ware, et al.; "Architecting for Power Management: The IBM POWER7 Approach"; 2010 IEEE 16th International Symposium on High Performance Computer Architecture (HPCA); Jan. 9, 2010; Piscataway, NJ, USA; pp. 1-11.

Govil, et al.; "Comparing Algorithms for Dynamic Speed-Setting of a Low-Power CPU"; Proceedings of the Annual International Conference on Mobile Computing and Networking; Mobicom; Nov. 13, 1995; pp. 13-25.

Office Action from Japanese Application No. 2013-526155, issued Sep. 30, 2014, English and Japanese versions pages 1-5.

* cited by examiner

DYNAMIC PERFORMANCE CONTROL OF PROCESSING NODES

PRIORITY INFORMATION

This invention is a continuation application of U.S. patent application Ser. No. 12/868,996, entitled "DYNAMIC PERFORMANCE CONTROL OF PROCESSING NODES", filed Aug. 26, 2010.

BACKGROUND

1. Field of the Invention

This invention relates to processors, and more particularly, to balancing performance and power consumption in processors.

2. Description of the Related Art

During the design of a computer or other processor-based system, many design factors must be considered. A successful design may require several tradeoffs between power consumption, performance, thermal output, and so forth. For example, the design of a computer system with an emphasis on high performance may allow for greater power consumption and thermal output. Conversely, the design of a portable computer system that is sometimes powered by a battery may emphasize reducing power consumption at the expense of some performance.

In some computer systems, an operating point (e.g., a clock frequency and operating voltage) may be adjusted according to a workload. In such systems, a compute-bounded workload (i.e. one that is processor intensive) may cause a processing node to be operated at a higher operating point, whereas a memory-bounded workload (i.e. one that includes a large number of memory accesses, which may involve large latencies) may cause the processing node to be operated at a lower operating point. For example, in some computer systems, a ratio of the amount of time in an active state to a total amount of operational time (i.e. active state and idle state) may be calculated by operating system software for a given interval. If the ratio exceeds a certain threshold, the processing node may be operated at a higher operating point. Otherwise, operations may occur at a lower operating point. Typical intervals for performing the calculation may range from 30-100 milliseconds, with some advanced systems performing the calculation as frequently as every 10 milliseconds.

SUMMARY OF EMBODIMENTS OF THE DISCLOSURE

An apparatus and method for dynamic performance control of processing nodes is disclosed. In one embodiment, a system includes a processing node and a power management unit. The power management unit may be configured to, for each of a plurality of first time intervals, monitor an activity level of the processing node. The power management may further be configured to cause the processing node to operate at a predefined high operating point of a plurality of operating points during at least one successive first time interval if the activity level in a given first time interval is greater than a high activity threshold, and cause the processing node to operate at a predefined low operating point of the plurality of operating points for the at least one successive first time interval if the activity level in the given first time interval is less than a low activity threshold. The power management unit may also be configured to enable operating system software to cause the processing node to operate at one of one or more predefined intermediate operating points of the plurality of operating points if the activity level for the at least one successive first time interval is less than the high activity threshold and greater than the low activity threshold in the given first time interval.

In one embodiment, a method includes, for each of a plurality of first time intervals, determining an activity level of a processing nod. The method may further include a power management unit causing the processing node to operate at a predefined high operating point of a plurality of operating points in at least one successive first time interval if the activity level exceeds a high activity threshold, and the power management unit causing the processing node to operate at a predefined low operating point of the plurality of operating points in the at least one successive first time interval if the activity level is less than the low activity threshold. The method may also include operating system software causing the processing node to operate at a one of a one or more intermediate operating points of the plurality of operating points if the activity level is less than the high activity threshold and greater than the low activity threshold

BRIEF DESCRIPTION OF THE DRAWINGS

Other aspects of the invention will become apparent upon reading the following detailed description and upon reference to the accompanying drawings in which.

Figure 1:
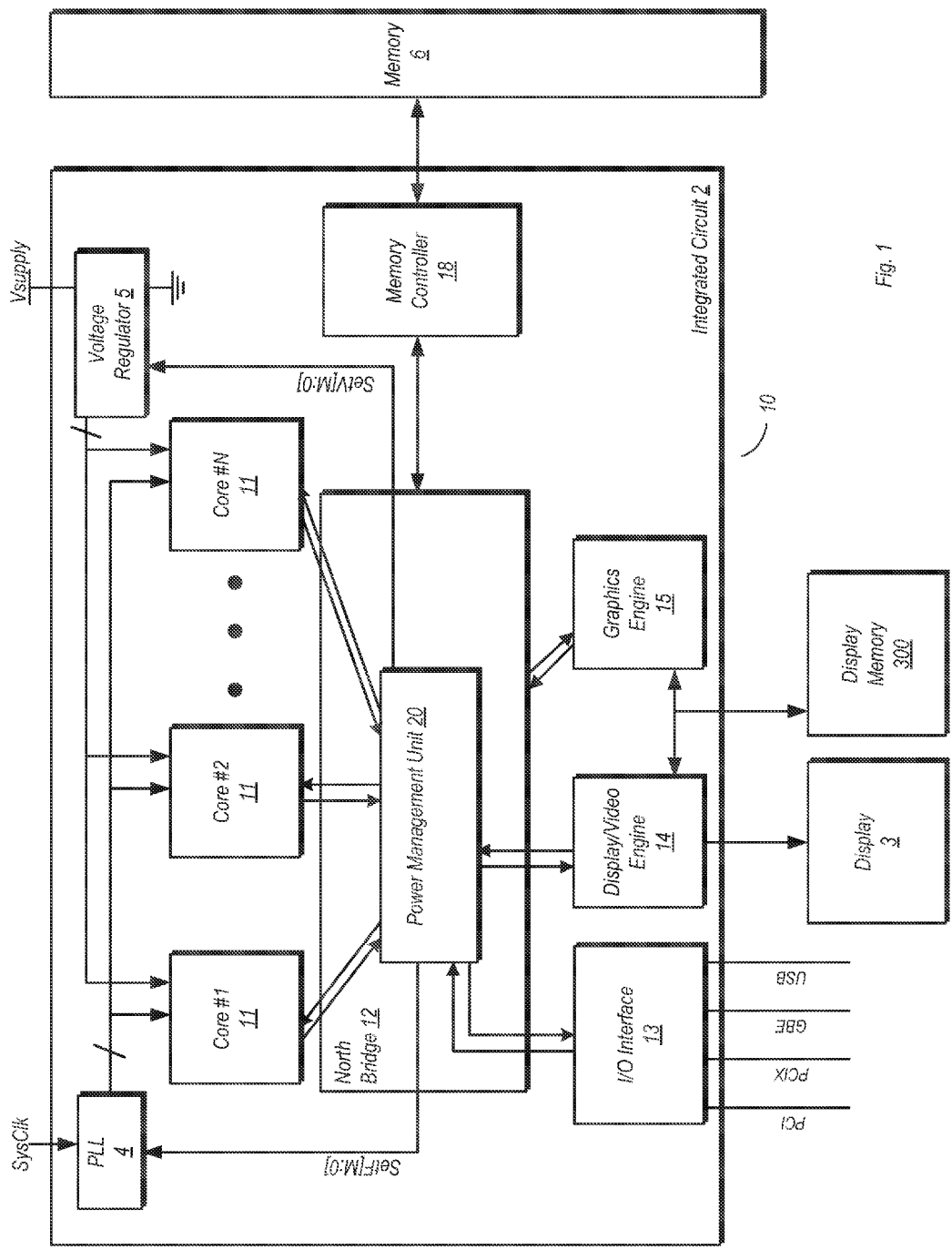
FIG. 1 is a block diagram of one embodiment of an integrated circuit (IC) system on a chip (SOC)

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling within the spirit and scope of the present invention as defined by the appended claims.

DETAILED DESCRIPTION

Overview:

The present disclosure is directed toward a method and apparatus for improving the performance-per-watt of a processor-based system. More particularly, the method and apparatus disclosed herein may be utilized to adjust an operating point of one or more processing nodes (e.g., processor cores of a single or multi-core microprocessor, individual stand-alone microprocessors, etc.) based on application activity (e.g., processing workload). In various embodiments, the operating point of a processing node may include a frequency of a clock signal provided thereto. An operating point may further include an operating voltage (e.g., a supply voltage) provided to the processing node. A highest operating point may thus be defined as an operating point having the highest clock frequency available to a processing node, and may also be defined as the operating point with the highest operating voltage available to the processing node. Conversely, the lowest operating point may be defined as the operating point having the lowest operational (e.g., non-zero) clock frequency available to a processing node, and may be further defined as the operating point with the lowest non-zero operating voltage available. An intermediate operating point may be defined as an operating point in which at least one of the clock frequency and operating voltage are set to respective values between the values which may be otherwise used to define the highest and lowest operating points.

Operating points for each of one or more processing nodes may be set by either a power management unit or by operating system (OS) software executing on at least one of the one or more processing nodes. For each processing node, a power management unit may monitor its activity level over a number of first time intervals, and may compare the monitored activity level to high and low activity thresholds. The power management unit may cause the processing node to operate at a higher one (e.g., the highest) of a plurality of operating points if the activity level exceeds the high activity threshold. The power management unit may cause the processing node to operate at a lower one of the plurality of operating points if the activity level is less than the low activity threshold. If the activity level is greater than the low threshold and less than the high threshold, the power management unit may enable operating system software to select one of one or more intermediate operating points for the processing node. The operating system software may monitor the activity level over a period of second time intervals, the duration of which is greater than each of the first time intervals. In one embodiment, the duration of each of the first time intervals is less than or equal to 100 microseconds, while the duration of each of the second time intervals is greater than or equal to 30 milliseconds. Accordingly, the power management unit may effect a change to an operating point faster than operating system software, thereby enabling more fine-grained control of the power consumption and thus the performance per watt of the processor. It is noted that the power management unit may at any time override an operating point selection made by the operating system should the monitored activity level meet or exceed the high activity threshold or be equal to or less than the low activity threshold.

The power management unit as described herein may be implemented as a hardware unit within a processor, and such embodiments may operate independently of OS software in selecting and setting operating points based on detected activity levels. In some embodiments, the functions of the power management unit may be implemented as firmware or as other software that operates independently of an OS. Regardless of the specific implementation, the power management unit may perform the functions described herein without the overhead (e.g., interrupts, etc.) that may accompany an embodiment that is controlled by an OS alone. The time intervals over which activity is monitored for various embodiments of the power management unit may be significantly smaller (e.g., one or more orders of magnitude) than the time intervals over which an OS may perform activity monitory that is used to set operating points.

In one embodiment, an operating point of a processing node may be adjusted depending on whether the application activity therein is compute-bounded, memory-bounded, or somewhere in between these two points. A compute-bounded workload may be defined as a processing workload that is computationally intensive, with infrequent (if any) accesses to main memory. Completion of a compute-bounded workload in the shortest amount of time possible may require that the processing node(s) executing the workload operate at a highest available clock frequency while maximizing the number of instructions executed per cycle. Accordingly, the method and apparatus described herein may be enabled to determine when a compute-bounded workload is executing, and further to increase the operating point (increase the clock frequency and/or operating voltage) to a high-performance state responsive thereto. In one embodiment, the method and apparatus may cause the processing node to operate at an operating point corresponding to the highest performance state available for that particular node responsive to detecting a compute-bounded workload.

When a processing workload is memory-bounded, the processing node may perform frequent accesses of main memory. Since the latency associated with main memory accesses can be orders of magnitude greater than a processor cycle time, a memory-bounded workload may be much less sensitive to the operating frequency (i.e. the clock frequency) of the processing node upon which it is being executed. More particularly, memory accesses may cause a processor to stall, and since the duration of these stalls is a function of memory access latency. The latency associated with memory accesses is function of the memory bus clock frequency, which is typically much lower than the core clock frequency. Therefore, increases in the core clock frequency typically do not result in corresponding performance increases in the processing of memory-bounded workloads. Moreover, reducing the core clock frequency when processing a memory-bounded workload does not typically result in a corresponding loss of performance, since memory access latency is usually the limiting factor in determining the speed at which these workloads may be executed. Accordingly, the method and apparatus described herein may be enabled to determine when a memory-bounded workload is executing, and further to decrease the operating point (e.g., reduce the clock frequency and/or operating voltage) to a low-performance state responsive thereto. Decreasing the operating point to a low-performance state when executing a memory-bounded workload may result in power savings without adversely impacting performance. In one embodiment, the method and apparatus may cause a processing node to operate at an operating point corresponding to a lowest non-idle performance state responsive to detecting a memory-bounded workload. The lowest non-idle operating point may be defined herein as an operating point in which a processing node is receiving power and a clock signal at a non-zero frequency.

Detection of compute-bounded and memory-bounded workloads for a given processing node may involve comparing an activity level of that node to a high threshold and a low threshold. If the activity level exceeds the high threshold, the processing node may be operated at an operating point corresponding to a high performance state. If the activity level is less than the low threshold, the processing node may be operated at an operating point corresponding to a low performance state. If the activity level is less than the high threshold but greater than the low threshold, the processing node may be operated at one of one or more intermediate operating points. In one embodiment, intermediate operating points may be selected by software (e.g., by operating system software).

Detection and comparison of the activity level for each processing node may be performed by a power management unit for each of a number of successive first time intervals. As noted above, the duration of the intervals may be on the order of microseconds. In one embodiment, the maximum duration of an interval may be 100 microseconds, with intervals as small as 10 microseconds contemplated. Embodiments in which the duration of the first intervals is less than 10 microseconds are also contemplated. Accordingly, the method and apparatus disclosed herein may allow for fine-grained operating point control in comparison to that provided by operating system software, in which the time intervals for monitoring, comparing, and setting the operating point can range between 30 and 100 milliseconds. In addition, the determination of the activity level and the operating point may be performed without requiring interrupts or other overhead that may be required by the operating system software. Thus, the performance per watt of power consumed may be optimized.

Processor with Power Management Unit:

FIG. 1 is a block diagram of one embodiment of an integrated circuit (IC) coupled to a memory. IC 2 and memory 6, along with display 3 and display memory 300, form at least a portion of computer system 10 in this example. In the embodiment shown, IC 2 is a processor having a number of processing nodes 11. Processing nodes 11 are processor cores in this particular example, and are thus also designated as Core #1, Core #2, and so forth. It is noted that the methodology to be described herein may be applied to other arrangements, such as multi-processor computer systems implementing multiple processors (which may be single-core or multi-core processors) on separate, unique IC dies. Furthermore, embodiments having only a single processing node 11 are also possible and contemplated.

Each processing node 11 is coupled to north bridge 12 in the embodiment shown. North bridge 12 may provide a wide variety of interface functions for each of processing nodes 11, including interfaces to memory and to various peripherals. In addition, north bridge 12 includes a power management unit 20 that is configured to manage the power consumption of each of processing nodes 11 based on their respective activity levels or workloads, as will be discussed in further detail below. Furthermore, in multi-core (or multi-processor) embodiments, power management unit 20 may set the operating points of the individual processing nodes 11 independent of one another. Thus, while a first processing node 11 may operate at a first operating point, a second processing node 11 may operate at a second operating point different than the first.

In various embodiments, the number of processing nodes 11 may be as few as one, or may be as many as feasible for implementation on an IC die. In multi-core embodiments, processing nodes 11 may be identical to each other (i.e. homogenous multi-core), or one or more processing nodes 11 may be different from others (i.e. heterogeneous multi-core). Processing nodes 11 may each include one or more execution units, cache memories, schedulers, branch prediction circuits, and so forth (an exemplary processing node will be discussed below with reference to FIG. 2). Furthermore, each of processing nodes 11 may be configured to assert requests for access to memory 6, which may function as the main memory for computer system 10. Such requests may include read requests and/or write requests, and may be initially received from a respective processing node 11 by north bridge 12. Requests for access to memory 6 may be routed through memory controller 18 in the embodiment shown.

I/O interface 13 is also coupled to north bridge 12 in the embodiment shown. I/O interface 13 may function as a south bridge device in computer system 10. A number of different types of peripheral buses may be coupled to I/O interface 13. In this particular example, the bus types include a peripheral component interconnect (PCI) bus, a PCI-Extended (PCI-X), a PCIE (PCI Express) bus, a gigabit Ethernet (GBE) bus, and a universal serial bus (USB). However, these bus types are exemplary, and many other bus types may also be coupled to I/O interface 13. Peripheral devices may be coupled to some or all of the peripheral buses. Such peripheral devices include (but are not limited to) keyboards, mice, printers, scanners, joysticks or other types of game controllers, media recording devices, external storage devices, network interface cards, and so forth. At least some of the peripheral devices that may be coupled to I/O unit 13 via a corresponding peripheral bus may assert memory access requests using direct memory access (DMA). These requests (which may include read and write requests) may be conveyed to north bridge 12 via I/O interface 13, and may be routed to memory controller 18.

In the embodiment shown, IC 2 includes a display/video engine 14 that is coupled to display 3 of computer system 10. Display 3 may be a flat-panel LCD (liquid crystal display), plasma display, a CRT (cathode ray tube), or any other suitable display type. Display/video engine 14 may perform various video processing functions and provide the processed information to display 3 for output as visual information. Some video processing functions, such as 3-D processing, processing for video games, and more complex types of graphics processing may be performed by graphics engine 15, with the processed information being relayed to display/video engine 14 via north bridge 12.

In this particular example, computer system 10 implements a non-unified memory architecture (NUMA) implementation, wherein video memory and RAM are separate from each other. In the embodiment shown, computer system 10 includes a display memory 300 coupled to display/video engine 14. Thus, instead of receiving video data from memory 6, video data may be accessed by display/video engine 14 from display memory 300. This may in turn allow for greater memory access bandwidth for each of cores 11 and any peripheral devices coupled to I/O interface 13 via one of the peripheral buses.

In the embodiment shown, IC 2 includes a phase-locked loop (PLL) 4 coupled to receive a system clock signal. PLL 4 may distribute corresponding clock signals to each of processing nodes 11. In this embodiment, the clock signals received by each of processing nodes 11 are independent of one another. Furthermore, PLL 4 in this embodiment is configured to individually control and alter the frequency of each of the clock signals provided to respective ones of processing nodes 11 independently of one another. As will be discussed in further detail below, the frequency of the clock signal received by any given one of processing nodes 11 may be increased or decreased in accordance with performance demands imposed thereupon. The various frequencies at which clock signals may be output from PLL 4 may correspond to different operating points for each of processing nodes 11. Accordingly, a change of operating point for a particular one of processing nodes 11 may be put into effect by changing the frequency of its respectively received clock signal.

In the case where changing the respective operating points of one or more processing nodes 11 includes the changing of one or more respective clock frequencies, power management unit 20 may change the state of digital signals SetF[M:0] provided to PLL 4. Responsive to the change in these signals, PLL 4 may change the clock frequency of the affected processing node(s).

In the embodiment shown, IC 2 also includes voltage regulator 5. In other embodiments, voltage regulator 5 may be implemented separately from IC 2. Voltage regulator 5 may provide a supply voltage to each of processing nodes 11. In some embodiments, voltage regulator 5 may provide a supply voltage that is variable according to a particular operating point (e.g., increased for greater performance, decreased for greater power savings). In some embodiments, each of processing nodes 11 may share a voltage plane. Thus, each processing node 11 in such an embodiment operates at the same voltage as the other ones of processing nodes 11. In another embodiment, voltage planes are not shared, and thus the supply voltage received by each processing node 11 may be set and adjusted independently of the respective supply voltages received by other ones of processing nodes 11. Thus, operating point adjustments that include adjustments of a supply voltage may be selectively applied to each processing node 11 independently of the others in embodiments having non-shared voltage planes. In the case where changing the operating point includes changing an operating voltage for one or more processing nodes 11, power management unit 20 may change the state of digital signals SetV[M:0] provided to voltage regulator 5. Responsive to the change in the signals SetV[M:0], voltage regulator 5 may adjust the supply voltage provided to the affected ones of processing nodes 11.

Operating points may be set for each of processing nodes 11, independently of one another, in accordance with a respective activity level (e.g., processing workload). In the embodiment shown, power management unit 20 may receive information indicating the activity level for each of processing nodes 11. The indicated activity level for each processing node may be compared to threshold values, and an operating point of the corresponding processing node may be adjusted accordingly based on the comparison results. The thresholds may include a high activity threshold and a low activity threshold. If the activity level for a given processing node 11 exceeds a high activity threshold, its operating point may be adjusted to a predefined high operating point (e.g., highest clock frequency and operating voltage). If the activity level for a given processing node 11 is less than a low activity threshold, then the operating point may be adjusted to a predefined low non-idle operating point (e.g., lowest non-zero clock frequency and voltage).

If a comparison operation indicates that the activity level of a given processing node 11 is less than the high activity threshold but greater than the low activity threshold, then power management unit 20 may enable operating system software (or other software) the particular processing node 11 to operate at one of one or more intermediate operating points. In some embodiments, a single intermediate operating point may be implemented. In other embodiments, multiple intermediate operating points may be utilized.

The comparing of activity levels for each of processing nodes 11 to the threshold values discussed above may be performed over a number of consecutive time intervals. When a comparison during a given time interval indicates the need to adjust the operating point of a processing node 11, the operating point may be adjusted for the next succeeding time interval. The comparison operation may be performed once for each interval, and any adjustments to be made based on the comparison results may be applied to the next succeeding interval. If the comparison results indicate that no change is necessary, the processing node 11 may continue at its current operating point for one or more successive time intervals, until the comparison results indicate an activity level that corresponds to a different operating point.

In one embodiment, software executing on integrated circuit 2, such as operating system (OS) software, may select the operating point for each of processing nodes 11 when the activity level is less than the high threshold and greater than the low threshold. However, comparison operations may continue to be performed by the power management unit for each time interval. If the comparison operations detect an activity level exceeding the high threshold or falling below the low threshold, the operating point for the affected processing node 11 may be changed accordingly, overriding that which may otherwise be specified by the OS or other mechanism used for selecting intermediate operating points. The OS may monitor activity over another set of time intervals that each having a duration that is greater than that of the time intervals used by power management unit 20. The duration of the time intervals for which the OS monitors activity levels may be at least one order of magnitude greater than those of power management unit 20. For example, in one embodiment, power management unit 20 may monitor activity levels (and thus effect operating point changes) over time intervals that are no greater than 100 microseconds. In contrast, operating system software in this embodiment may monitor activity levels (and thus effect operating point changes) over time intervals that are no less than 30 milliseconds.

As previously noted, an operating point of a processing node 11 may be defined by at least a clock frequency, and may also be defined by an operating voltage. Generally speaking, transitioning to a "higher" operating point may be defined by increasing the clock frequency for the affected processing node 11. Transitioning to a higher operating point may also include increasing its operating (e.g., supply) voltage. Similarly, transitioning to a "lower" operating point may be defined by decreasing the clock frequency for the affected processing node 11. A decrease in the operating/supply voltage provided to an affected processing node 11 may also be included in the definition of transitioning to a lower operating point.

In one embodiment, the operating points may correspond to performance states (hereinafter 'P-states') of the Advanced Configuration and Power Interface (ACPI) specification. Table 1 below lists P-states for one embodiment implemented using the ACPI standard.

TABLE 1

| P-state index | Frequency | Voltage |
|---|---|---|
| P0 | 2 GHz | 1.1 V |
| P1 | 1.8 GHz | 1.0 V |
| P2 | 1.5 GHz | 0.9 V |
| P3 | 1 GHz | 0.85 V |
| P4 | 800 MHz | 0.8 V |

The P-states listed in Table 1 above may be applied when an ACPI-compliant processor is operating in a non-idle state known as C0. For an embodiment corresponding to Table 1 above, P-state P0 is the highest operating point, having a clock frequency of 2 GHz and an operating voltage of 1.1 volts. Power management unit 20 in one embodiment may cause a processing node 11 to operate at P-state P0 responsive to a corresponding activity level exceeding the high activity threshold. Operation in P-state P0 may be utilized for processing workloads that are compute-bounded. A compute-bounded workload may be time sensitive and computationally intensive, requiring few (if any) memory accesses. It may be desirable to execute the workload in the shortest time possible to maintain maximum performance while also enabling a quicker return to a P-state commensurate with lower power consumption. Therefore, compute-bounded workloads having a high activity level may be executed in P-state P0, which may enable faster completion.

P-state P4 is the lowest non-idle operating point in this particular embodiment, having a clock frequency of 800 MHz and an operating voltage of 0.8V. Power management unit 20 may cause a processing node 11 to operating in P-state P4 responsive to a corresponding activity level that is less than the low activity threshold. P-state P4 may be used with memory-bounded workloads as well as with other tasks that are not time-sensitive (or frequency-sensitive). Memory-bounded workloads are those which include frequent accesses to system memory. Since memory accesses involve large latencies (in comparison with the execution times of instructions that do not access memory), reducing the clock frequency for memory-bounded workloads may have a minimal performance impact and with power savings that may improve the performance-per-watt metric of the system.

If a detected activity level is greater than the low activity threshold and less than the high activity threshold, operation of the corresponding processing node 11 may be set to any one of P-states P1, P2, P3, under direction of an OS, other software, firmware, and/or other hardware, depending on the specific embodiment.

It is noted that the P-states listed in Table 1 are an exemplary set of operating points. Embodiments that use operating points having different clock frequencies and operating voltages are possible and contemplated. Further, as previously noted above, some embodiments may utilize a shared voltage plane for processing nodes 11, and thus their respective operating points may be defined on the basis of a clock frequency. In some embodiments, the operating voltage for each of the processing nodes may either remain fixed, while in other embodiments, the operating voltage may be adjusted for all processing nodes 11 at the same time.

It should be noted that embodiments are possible and contemplated wherein the various units discussed above are implemented on separate IC's. For example, one embodiment is contemplated wherein cores 11 are implemented on a first IC, north bridge 12 and memory controller 18 are on another IC, while the remaining functional units are on yet another IC. In general, the functional units discussed above may be implemented on as many or as few different ICs as desired, as well as on a single IC.

It is also noted that the operating points listed as P-states in Table 1 above may also be utilized with non-ACPI embodiments.

Figure 2:
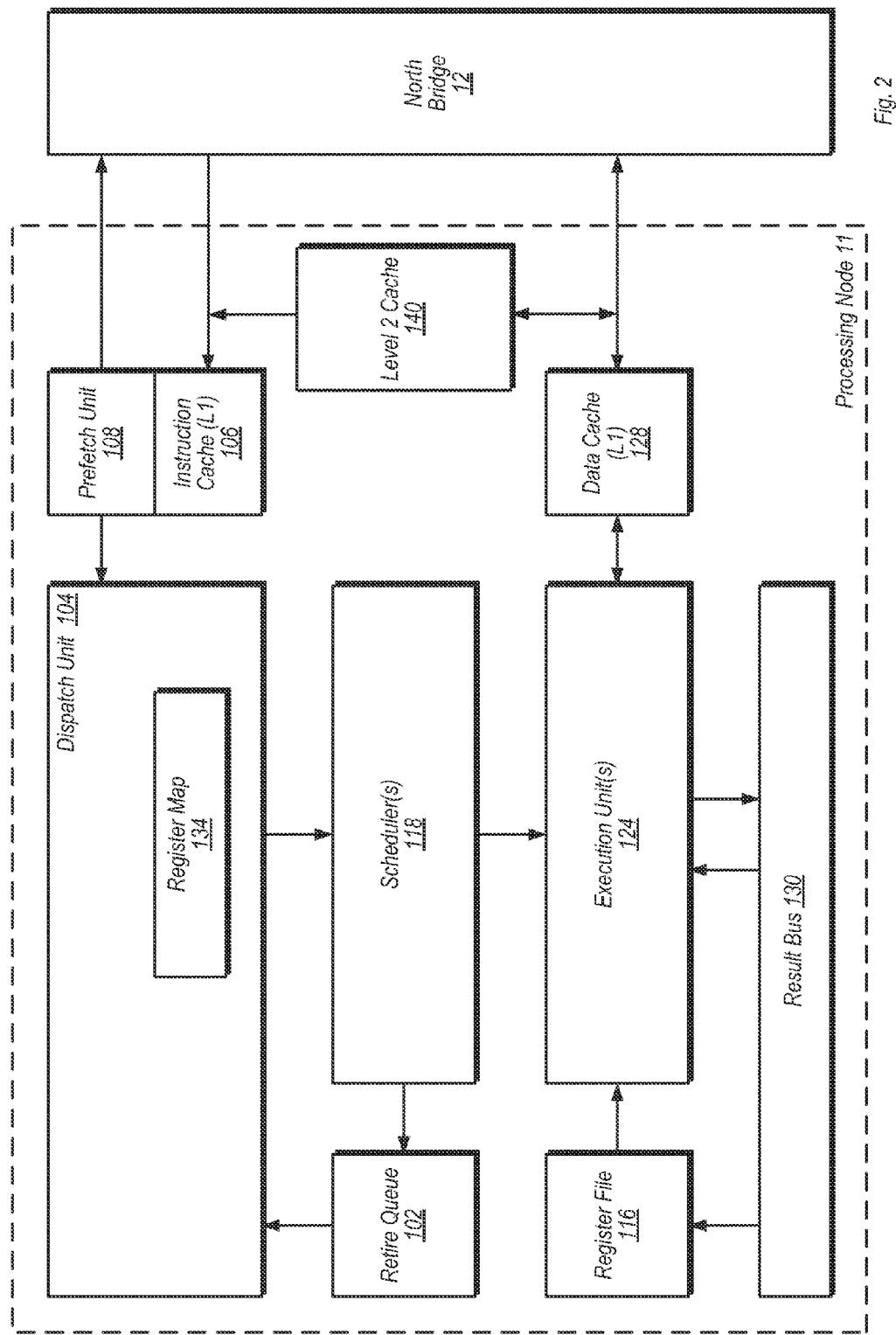
FIG. 2 is a block diagram of one embodiment of a processing node.

Processing Node:

FIG. 2 is a block diagram of one embodiment of a processing node 11. The processing node 11 is configured to execute instructions that may be stored in a system memory 200. Many of these instructions operate on data that is also stored in the system memory 200. It is noted that the system memory 200 may be physically distributed throughout a computer system and/or may be accessed by one or more processors 100.

In the illustrated embodiment, the processing node 11 may include a level one (L1) instruction cache 106 and an L1 data cache 128. The processing node 11 may include a prefetch unit 108 coupled to the instruction cache 106. A dispatch unit 104 may be configured to receive instructions from the instruction cache 106 and to dispatch operations to the scheduler(s) 118. One or more of the schedulers 118 may be coupled to receive dispatched operations from the dispatch unit 104 and to issue operations to the one or more execution unit(s) 124. The execution unit(s) 124 may include one or more integer units, one or more floating point units, and one or more load/store units. Results generated by the execution unit(s) 124 may be output to one or more result buses 130 (a single result bus is shown here for clarity, although multiple result buses are possible and contemplated). These results may be used as operand values for subsequently issued instructions and/or stored to the register file 116. A retire queue 102 may be coupled to the scheduler(s) 118 and the dispatch unit 104. The retire queue 102 may be configured to determine when each issued operation may be retired.

In one embodiment, the processing node 11 may be designed to be compatible with the x86 architecture (also known as the Intel Architecture-32, or IA-32). In another embodiment, the processing node 11 may be compatible with a 64-bit architecture. Embodiments of processing node 11 compatible with other architectures are contemplated as well.

Note that each of the processing node 11 may also include many other components. For example, the processing node 11 may include a branch prediction unit (not shown) configured to predict branches in executing instruction threads.

The instruction cache 106 may store instructions for fetch by the dispatch unit 104. Instruction code may be provided to the instruction cache 106 for storage by prefetching code from the system memory 200 through the prefetch unit 108. Instruction cache 106 may be implemented in various configurations (e.g., set-associative, fully-associative, or direct-mapped).

Processing node 11 may also include a level two (L2) cache 140. Whereas instruction cache 106 may be used to store instructions and data cache 128 may be used to store data (e.g., operands), L2 cache 140 may be a unified used to store instructions and data. Although not explicitly shown here, some embodiments may also include a level three (L3) cache. In general, the number of cache levels may vary from one embodiment to the next.

The prefetch unit 108 may prefetch instruction code from the system memory 200 for storage within the instruction cache 106. The prefetch unit 108 may employ a variety of specific code prefetching techniques and algorithms.

The dispatch unit 104 may output operations executable by the execution unit(s) 124 as well as operand address information, immediate data and/or displacement data. In some embodiments, the dispatch unit 104 may include decoding circuitry (not shown) for decoding certain instructions into operations executable within the execution unit(s) 124. Simple instructions may correspond to a single operation. In some embodiments, more complex instructions may correspond to multiple operations. Upon decode of an operation that involves the update of a register, a register location within register file 116 may be reserved to store speculative register states (in an alternative embodiment, a reorder buffer may be used to store one or more speculative register states for each register and the register file 116 may store a committed register state for each register). A register map 134 may translate logical register names of source and destination operands to physical register numbers in order to facilitate register renaming. The register map 134 may track which registers within the register file 116 are currently allocated and unallocated.

The processing node 11 of FIG. 2 may support out of order execution. The retire queue 102 may keep track of the original program sequence for register read and write operations, allow for speculative instruction execution and branch misprediction recovery, and facilitate precise exceptions. In some embodiments, the retire queue 102 may also support register renaming by providing data value storage for speculative register states (e.g. similar to a reorder buffer). In other embodiments, the retire queue 102 may function similarly to a reorder buffer but may not provide any data value storage. As operations are retired, the retire queue 102 may deallocate registers in the register file 116 that are no longer needed to store speculative register states and provide signals to the register map 134 indicating which registers are currently free. By maintaining speculative register states within the register file 116 (or, in alternative embodiments, within a reorder buffer) until the operations that generated those states are validated, the results of speculatively-executed operations along a mispredicted path may be invalidated in the register file 116 if a branch prediction is incorrect.

In one embodiment, a given register of register file 116 may be configured to store a data result of an executed instruction and may also store one or more flag bits that may be updated by the executed instruction. Flag bits may convey various types of information that may be important in executing subsequent instructions (e.g. indicating a carry or overflow situation exists as a result of an addition or multiplication operation. Architecturally, a flags register may be defined that stores the flags. Thus, a write to the given register may update both a logical register and the flags register. It should be noted that not all instructions may update the one or more flags.

The register map 134 may assign a physical register to a particular logical register (e.g. architected register or microarchitecturally specified registers) specified as a destination operand for an operation. The dispatch unit 104 may determine that the register file 116 has a previously allocated physical register assigned to a logical register specified as a source operand in a given operation. The register map 134 may provide a tag for the physical register most recently assigned to that logical register. This tag may be used to access the operand's data value in the register file 116 or to receive the data value via result forwarding on the result bus 130. If the operand corresponds to a memory location, the operand value may be provided on the result bus (for result forwarding and/or storage in the register file 116) through a load/store unit (not shown). Operand data values may be provided to the execution unit(s) 124 when the operation is issued by one of the scheduler(s) 118. Note that in alternative embodiments, operand values may be provided to a corresponding scheduler 118 when an operation is dispatched (instead of being provided to a corresponding execution unit 124 when the operation is issued).

As used herein, a scheduler is a device that detects when operations are ready for execution and issues ready operations to one or more execution units. For example, a reservation station may be one type of scheduler. Independent reservation stations per execution unit may be provided, or a central reservation station from which operations are issued may be provided. In other embodiments, a central scheduler which retains the operations until retirement may be used. Each scheduler 118 may be capable of holding operation information (e.g., the operation as well as operand values, operand tags, and/or immediate data) for several pending operations awaiting issue to an execution unit 124. In some embodiments, each scheduler 118 may not provide operand value storage. Instead, each scheduler may monitor issued operations and results available in the register file 116 in order to determine when operand values will be available to be read by the execution unit(s) 124 (from the register file 116 or the result bus 130).

Although not explicitly shown here, a number of different communications paths may be provided between the various units of processing node 11 (including units not explicitly shown) and power management unit 20 shown in FIG. 1. More particularly, processing node 11 may utilize such communications paths in order to provide information indicating an activity level to power management unit 20. For example, retirement queue 102 may provide information regarding instruction retirements to power management unit 20. In another example, execution unit(s) 124 may provide information concerning executed instructions, dispatch unit 104 may provide information concerning dispatched instructions, scheduler(s) 118 may provide information concerning scheduled instructions, and any one (or all) of the various caches may provide information regarding cache hits or misses. Of units that may be present but are not explicitly shown here, a branch prediction unit may provide information regarding branch mispredictions, for one example. Other units not mentioned here may also provide other types of information to power management unit 20. The information received from the various units of processing node 11 may be used to determine its activity level. Various methods of determining the activity level may be applied, and may weigh certain types of information more than other types. In addition, some types of information may be disregarded altogether at certain times. The activity level determined from the information provide may in turn be used to select an operating point for processing node 11.

Figure 3:
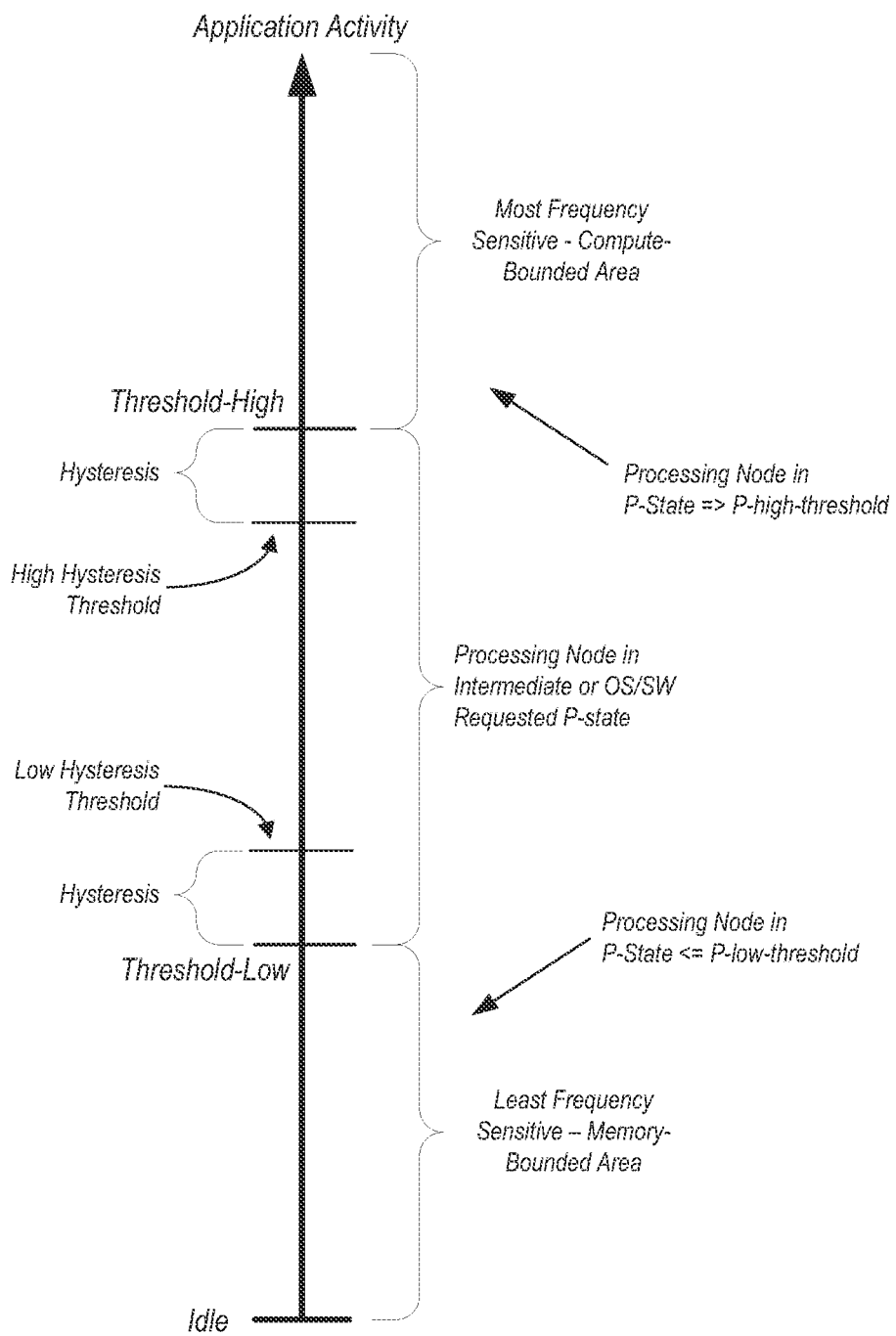
FIG. 3 is a diagram illustrating the operation of one embodiment of a power management unit.

Conceptual View:

FIG. 3 is a diagram illustrating the operation of one embodiment of a power management unit with regard to application activity. In the example shown, the graph is divided into three main regions: the region between 'Idle' and the low threshold, the region between the low threshold and the high threshold, and the region above the high threshold.

An activity level in the first region (i.e. less than the low threshold) is indicative of a processing workload that is memory-bounded or otherwise low frequency sensitivity (with respect to the clock frequency of the corresponding processing node 11). A processing node 11 upon which such an activity level is detected may be placed in a lowest possible non-idle operating point with little (if any) negative impact on overall processing node performance. The lowest non-idle operating point may be defined as one having a lowest clock frequency. The lowest possible operating point may also be defined by one having a lowest possible operating voltage. Using the example of Table 1 above, when the activity level of a processing node 11 is determined to be in this region during a given time interval, it may be placed in P-state P4 for at least the next time interval.

An activity level in the third region (i.e. above than the high threshold) is indicative of a processing workload that is compute-bounded or otherwise high frequency sensitivity (with respect to the clock signal). When this activity level is detected for a given processing node 11 during a time interval, the highest operating point may be selected for that node for at least the next time interval. Using the example of Table 1 above, detecting a high activity level may result in power management unit 20 causing the corresponding processing node to be placed into the P0 state. This may allow the workload to execute with maximum performance while completing the task faster.

When the detected activity level for a given time interval is detected in the second region (above the low threshold but less than the high threshold), the corresponding processing node may be placed at an operating point requested by an operating system (OS), other software, firmware, or other hardware. P-states P1, P2, and P3 from Table 1 are examples of intermediate operating point that may be utilized in the second region.

In embodiments where the OS or other software selects the operating point in the second region, the processing node may remain operating at that particular point for a number of time intervals, assuming that the detected application activity level remains commensurate with the second region (i.e. above the low threshold and less than the high threshold). Changes from one intermediate operating point to another operating point may occur according to much longer time intervals than those used for determining operation at the highest and lowest operating points. Whereas comparisons of the application activity level to the low and high thresholds may continue occur for intervals on the order of every 10-100 microseconds, comparisons used for determining which intermediate operating point is the most appropriate may occur for intervals on the order of every 30-100 milliseconds. Thus, power management unit 20 may continue conducting the comparisons of application activity levels to the low and high thresholds, and may override the intermediate operating point selection by shifting the affected processing node 11 to the highest or lowest operating point any time a corresponding activity level is detected.

In addition to the high and low thresholds shown in FIG. 3, hysteresis threshold levels may also be considered when determining whether or not to change the operating point of a processing node. A high hysteresis threshold may also be considered when determining whether to transition into or out of the highest operating point, while a low hysteresis threshold may be considered when determining whether to transition into or out of the lowest operating point. Utilizing these hysteresis thresholds may prevent the transitioning to a non-optimal operating point due to an anomaly. For example, consider a situation when a compute-bounded workload is executing in P-state P0. A branch misprediction in this situation may cause a pipeline stall, thereby causing a momentary decrease in the overall activity level. The high hysteresis threshold level may be factored in for such a situation, thereby enabling the corresponding processing node 11 to remain operating in P-state P0.

The operation described above may enhance the efficiency of a processor by improving its performance per watt of power consumed. Reducing the clock frequency and operating voltage to their lowest possible operational values for the least frequency sensitive and/or memory-bounded applications may in turn allow those applications to still execute in a timely manner without wasting power that is otherwise unneeded. Increasing the clock frequency and operating voltage to their highest possible operational values for those applications that are the most frequency sensitive and/or compute-bounded applications may allows those applications to execute faster at the desired performance levels and thus enable upon completion a quicker return to a operating point with lower power consumption.

Figure 4:
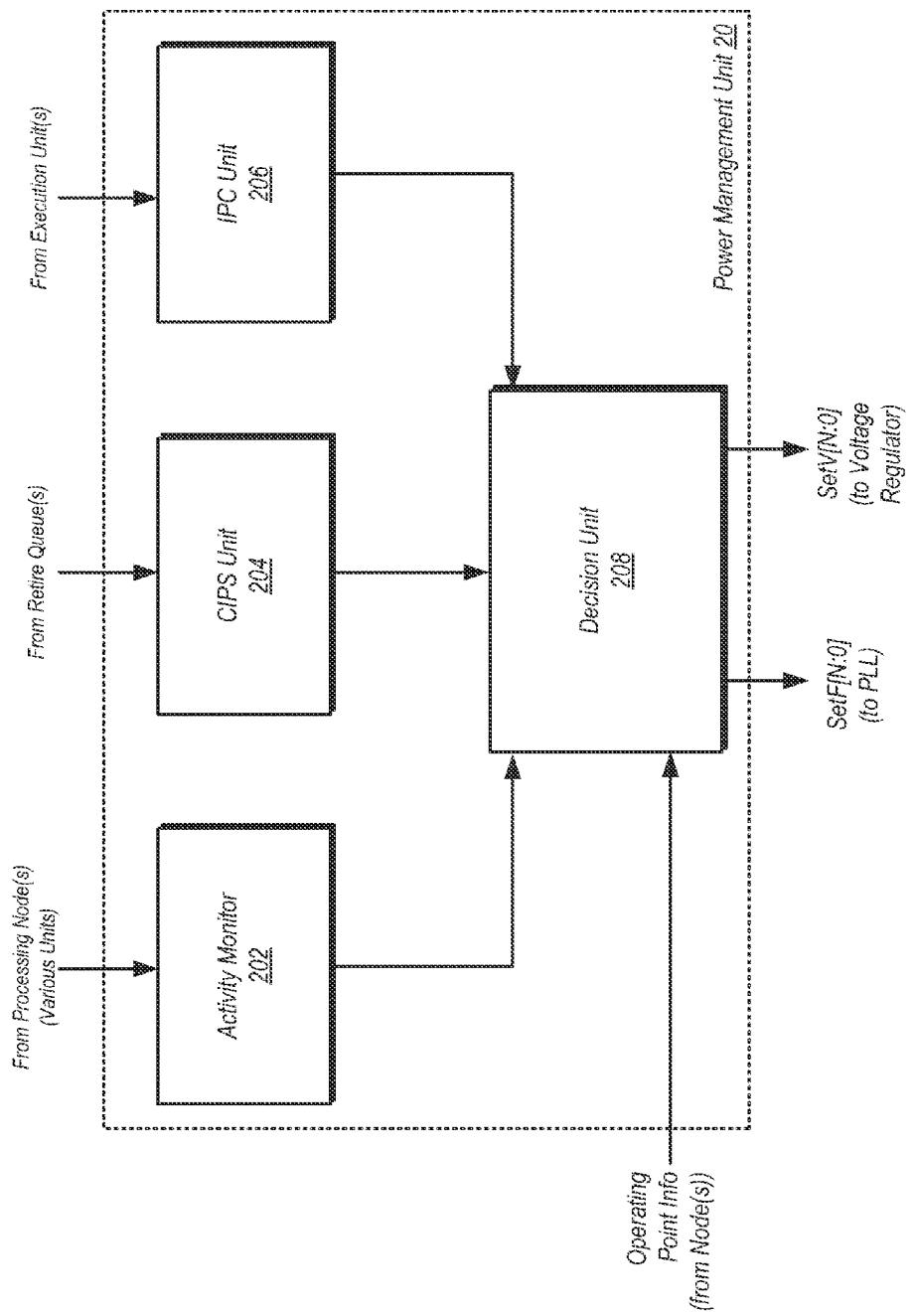
FIG. 4 is a block diagram of one embodiment of a power management unit.

Power Management Unit and Components Thereof:

FIG. 4 is a block diagram illustrating one embodiment of a power management unit. In the embodiment shown, power management unit 20 is configured to monitor the activity levels of each of one or more processing nodes using activity monitor 202, committed instructions per second (CIPS) unit 204, and instructions-per-cycle (IPC) unit 206, each of which will be discussed in further detail below. These various units may provide information to decision unit 208. This information may be used by decision unit 208 to set the operating point for each of processing nodes 11. Decision unit 208 may consider information provided from selected ones of these units, or from each in order to determine the operating points for each of processing nodes 11. Decision unit 208 is also coupled to receive information indicating the present operating point of each of processing nodes 11.

Changes to the operating point of a given processing node 11 may be performed by changing the frequency of a clock signal provided to thereto, and may also include changing a respective supply voltage. Clock frequency adjustments for each of processing nodes 11 by decision unit 208 may be effected through changes to the states of signals SetF[N:0]. Operating voltage adjustments for each of processing nodes 11 may be effected through changes to the states of signals SetV[N:0].

It is noted that the embodiment of power management unit 20 shown in FIG. 4 is exemplary, and other embodiments are possible and contemplated. Embodiments that include only one of activity monitor 202, CIPS unit 204, or IPC unit 206 are also possible and contemplated, and such embodiments may be implemented without the use of decision unit 208. For example, an embodiment is contemplated wherein the activity level of processing nodes 11 is determined based on information provided to CIPS unit 204. In such an embodiment, CIPS unit 204 may incorporate at least some of the functions otherwise provided by decision unit 208.

Generally speaking, power management unit 20 may be implemented in any configuration in which an activity level/processing workload of one or more processing nodes may be monitored and which may effect a change of operating point accordingly. More particularly, power management unit 20 may be implemented in any configuration in which activity levels of each of one or more processing nodes are compared to high and low activity thresholds for each of a plurality of time intervals, and in which respective operating points for a next succeeding time interval may be selected according to the results of the comparisons. More particularly, power management unit 20 may be implemented in any configuration in which operation in a next succeeding time interval is set to a highest operating point (e.g., P-state P0 from Table 1 above) if the monitored activity level exceeds a high activity threshold, a lowest operating point (e.g., P-state P4) if the activity level is less than a low activity threshold, or in one of one or more intermediate operating points (e.g., P-states P1, P2, or P3) if the activity level is less than the high threshold and greater than the low threshold.

Figure 5:
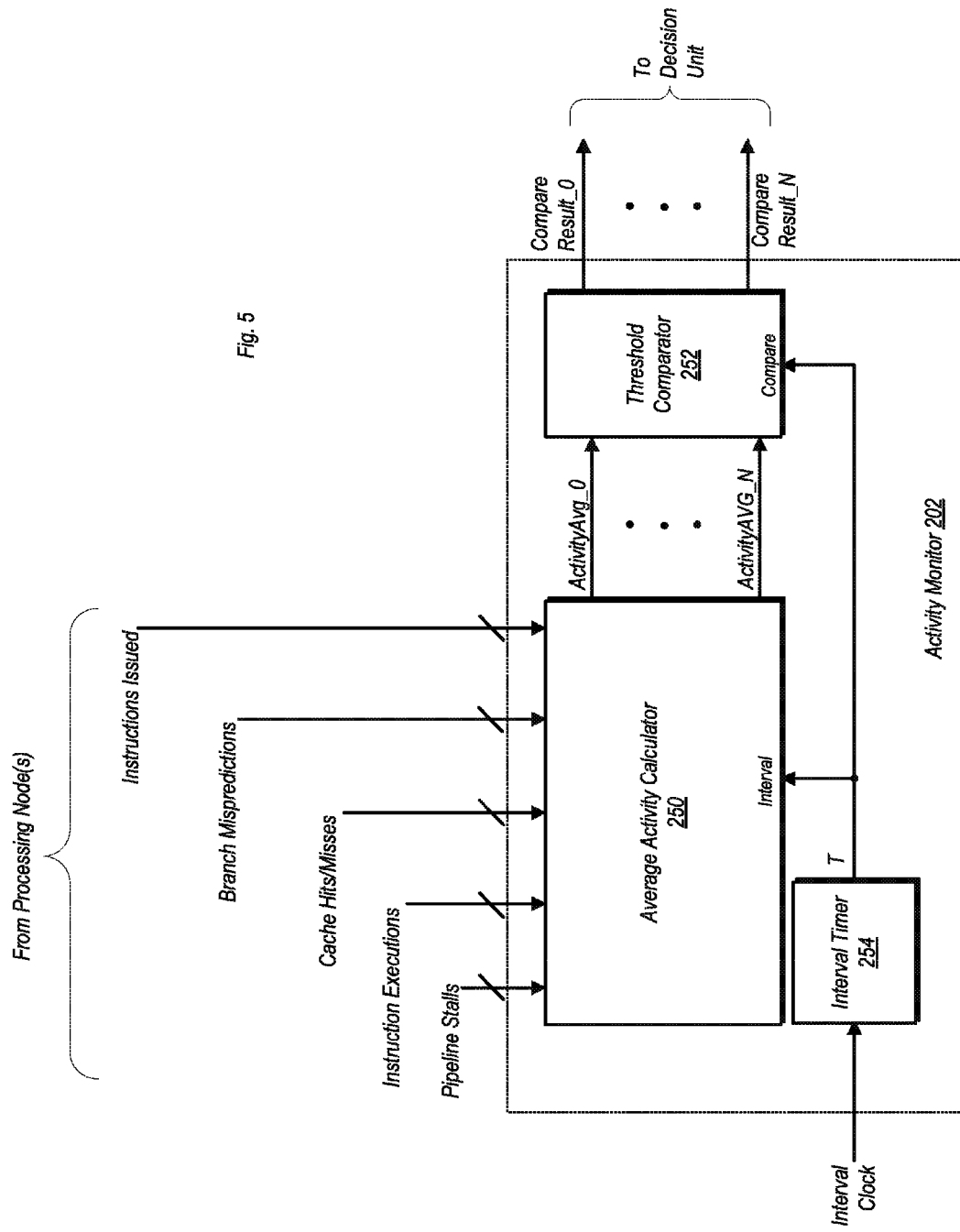
FIG. 5 is a block diagram illustrating one embodiment of an activity monitor.

Turning now to FIG. 5, a block diagram illustrating one embodiment of an activity monitor is shown. In the embodiment shown, activity monitor 202 includes an average activity calculator (AAC) 250, a threshold comparator 252, and an interval timer 254. Activity monitor 202 in the embodiment shown is configured to calculate and track a moving average of activity for one or more processing nodes 11, and to compare the average activity level with high and low activity thresholds. The results of the comparison may be used to determine the appropriate operating point for the processing node. In the embodiment shown, comparisons are conducted one each interval, which is times by interval timer 254.

AAC 250 may determine the activity level for each processing node 11 coupled thereto based on one or more metrics. In this particular embodiment, AAC 250 is coupled to receive information regarding pipeline stalls, instruction executions, cache hits and misses, branch mispredictions, and instructions issued. Embodiments that utilize metrics other than those explicitly discussed herein or in addition to those discussed herein are also possible and contemplated. It is also noted that some of these metrics might be given a greater weight than others in some embodiments.

The average activity level calculated and tracked by AAC 250 may be determined based on any one of these metrics, an aggregate of two or more of these metrics, or a combination of all of these metrics. For example, AAC 250 may determine that a processor workload is memory-bounded based both on cache misses and pipeline stalls, both of which may occur frequently in applications requiring a large number of memory accesses. In another example, a high number of instruction executions with few cache accesses (indicated by a total number of cache hits and misses) may indicate a compute-bounded workload.

Based on both information received during a present time interval as well as historical information, AAC 250 may determine the average activity for each processing node 11 for which activity was reported. In the embodiment shown, averages may be determined responsive to interval timer 254 asserting a signal T. Interval timer 254 in the embodiment shown is coupled to receive an interval clock signal, and may assert the signal T after a certain number of cycles of this clock signal have been received.

The computed activity average for each processing node 11 may be provided from AAC 250 to threshold comparator 252. Threshold comparator 252 may conduct comparisons of the received activity levels responsive to interval timer 254 asserting the signal T, which may be received on its compare input. A delay time may be allowed to enable AAC 250 to determine and provide the results, with threshold comparator 252 conducting the comparisons after the delay time has elapsed. Threshold comparator 252 may compare the calculated activity average for each processing node to the low and high activity thresholds discussed above. These comparison results may then be provided from threshold comparator 252 to decision unit 208, which then may cause adjustments to the operating points for those processing nodes 11 in accordance with the operation of power management unit 20 as described above. These operations in activity monitor 202 may be repeated for each time interval as timed by interval timer 254.

Figure 6:
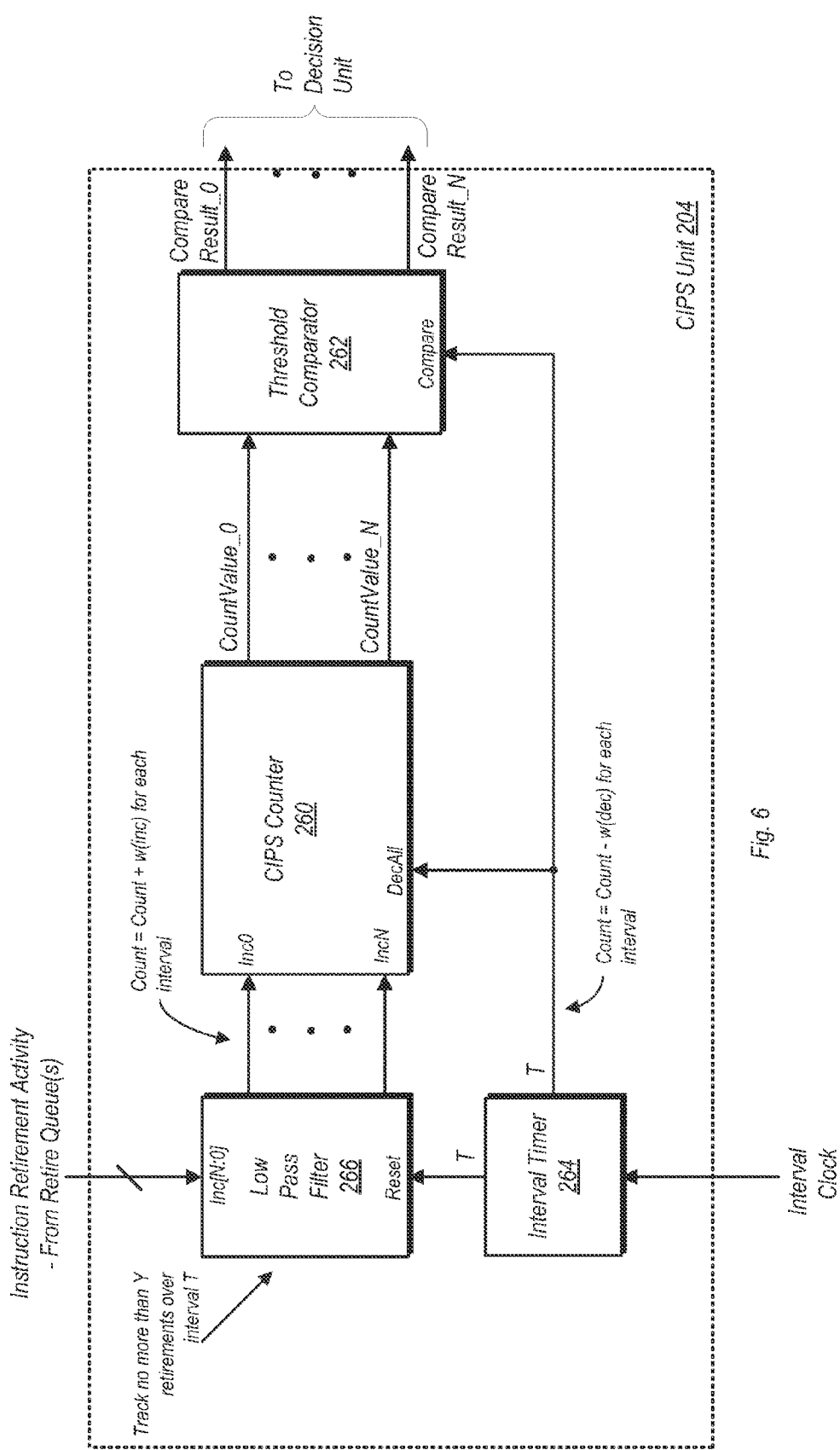
FIG. 6 is a block diagram illustrating one embodiment of a CIPS (committed instructions per second) unit.

FIG. 6 is a block diagram illustrating one embodiment of CIPS unit 204. In the embodiment shown, CIPS unit 204 includes a low pass filter 266, CIPS counter 260, threshold comparators 262, and interval timer 264. In the embodiment shown, CIPS unit 154 is coupled to receive information regarding retired instructions from a retirement queue (e.g., retirement queue 102 of FIG. 2) for each of processing nodes 11. CIPS unit 204 may determine a number of instructions retired in a predetermined interval, and may use this value to extrapolate the CIPS value. The CIPS value may thus be indicative of the rate at which instructions are executed and actually retired (as opposed to some instructions that are speculatively executed and not retired, e.g., due to a branch misprediction).

Retirement indications may be received from the processing nodes 11 may initially be provided to low pass filter 266. Low pass filter 266 may be implemented as one or more counters, with each counter corresponding to one of processing nodes 11. The counters in low pass filter 266 may have an upper limit of M, and thus no more than M retirements over an interval T are tracked by CIPS unit 204 in this embodiment. This may prevent a short, sudden burst of activity from being misinterpreted as a high activity and causing an otherwise undesirable transition to the highest operating point for the reporting processing node 11.

Low pass filter 266 includes a reset input coupled to interval timer 264. When the interval is complete, interval timer 264 may assert the T signal. Responsive to receiving the T signal on the reset input, each counter of low pass filter 266 may be reset to zero.

CIPS counter 260 in the embodiment shown also includes a number of counters, one corresponding to each processing node 11. Each time a counter in low pass filter increments, a corresponding counter in CIPS counter 260 may also increment. The incrementing of a counter in CIPS counter 260 may be weighted. Accordingly, there may not always be a one-to-one correspondence between increments of the counters of low pass filter 266 and CIPS counter 260.

The counters of CIPS counter 260 may also be conditionally decremented responsive to the assertion of the T signal by interval timer 264 (which is provided to the DecAll). In one embodiment, a given counter of CIPS counter 260 may be decremented at the end of any interval (responsive to assertion of the T signal) in which the number of instruction retirements of a corresponding processing node 11 is less than or equal to the expected number for the current operating point. Otherwise, if the number of instruction retirements for the corresponding processing node 11 exceeds the number of expected retirements during that given interval, the counter may not be decremented responsive to assertion of the T signal.

The decrements may also be weighted. The weighting of increments and decrements of may enable biasing of the power management functions described herein to be performance biased or power biased. In cases where the power management functions are performance biased, the weighting may place an emphasis on incrementing, thereby causing higher counts in CIPS counter 260 responsive to instruction retirements. In cases where the emphasis is on reduced power consumption (i.e. power biased), the weighting may place an emphasis on decrementing, thereby causing lower counts in CIPS counter 260 responsive to instruction retirements. This weighting may be configurable by various mechanisms, such as programming by a user, through firmware, programming fuses, and so forth.

The count values generated by CIPS counter 260 may be provided to threshold comparator 262. In the embodiment shown, threshold comparator 262 may function in a manner similar to its counterpart shown in FIG. 5. Each count value may be compared to high and low activity thresholds, and the operating point may be adjusted for those processing nodes in which the high or low activity threshold has been crossed relative to the previous time interval. The comparisons may be conducted once each interval, responsive to the assertion of the T signal by interval timer 264, which may be received on the Compare input. The comparison results may be provided to decision unit 208, which may adjust operating points of the processing nodes 11 accordingly.

Figure 7:
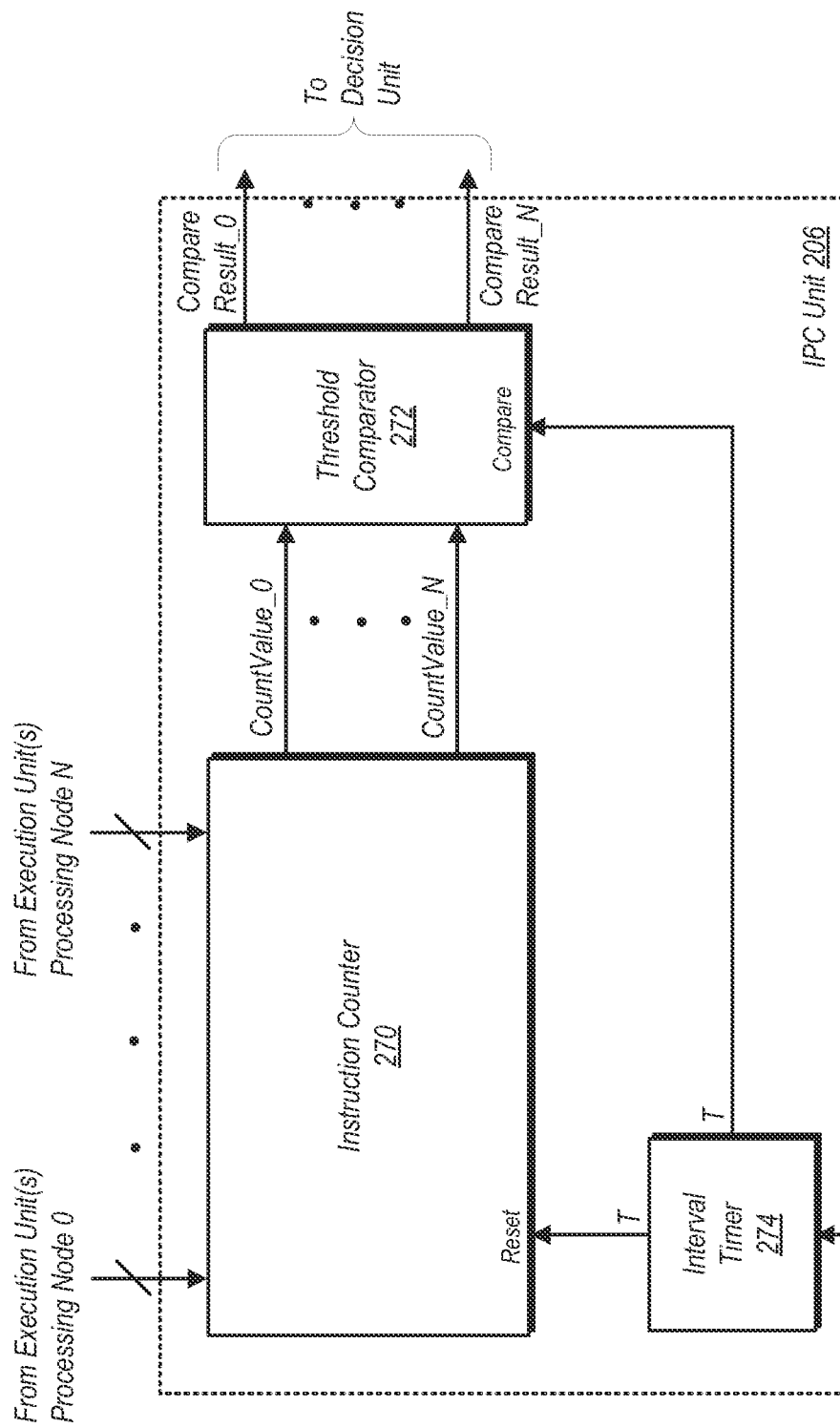
FIG. 7 is a block diagram of one embodiment of an IPC (instructions per cycle) unit.

FIG. 7 is a block diagram of one embodiment of IPC unit 206. In the embodiment shown, IPC unit 206 includes an instruction counter that may be coupled to receive indications of executed instructions from each of a number of processing nodes 11. This may include receiving indications of executed instructions from more than one execution unit in embodiments wherein processing nodes 11 are superscalar processing nodes. Instruction counter 270 may track a count of the instructions executed for each of processing nodes 11. The count tracked for each processing node may be provided as a count value to threshold comparator 272, which may perform comparisons to high and low activity thresholds in a manner similar to its counterparts discussed above with reference to FIGS. 5 and 6. The comparison results may be provided to decision unit 208, which may use the count values to determine if any operating point changes are to be made to the corresponding processing nodes 11. The counting and comparing may be performed on an interval-by-interval basis as controlled by interval timer 274. The counters of instruction counter 270 may be reset when each interval completes, as indicated by the assertion of the T signal by interval timer 274.

As previously noted, the comparison results provided by activity monitor 202, CIPS unit 204, and IPC unit 206 may each be provided to decision unit 208. Based on the provided comparison results, decision unit 208 may cause a change to the operating point of one or more of processing nodes 11 by causing a change to a respective clock frequency, a respective operating voltage, or both. In some embodiments, decision unit 208 may provide weighting to the comparison results, giving more weight to some than others. For example, decision unit 208 may provide additional weighting comparison results received from activity monitor 202 and CIPS unit 204 relative to those received from IPC unit 206.

In another embodiment, decision unit 208 may determine whether to change an operating point based on a voting scheme in the event different comparison results are received. For example, of both activity monitor 202 and CIPS unit 204 indicate an activity level exceeding the high activity threshold while IPC unit 206 does not indicate the same, decision unit 208 may change the operating point of the corresponding processing node to P-state P0. In another embodiment, decision unit 208 may be configurable to consider only one of the units (e.g., consider only the information from CIPS unit 204) when determining whether or not to change the operating point of a processing node.

In general, decision unit 208 may be configured to determine the appropriate operating point for each processing node 11 in any suitable manner. Furthermore, embodiments of power management unit 20 that include only one of the units (e.g., activity monitor 202) are also possible and contemplated, and in such embodiments, the functions analogous to setting the states of the SetF and SetV signals may be incorporated therein.

Figure 8:
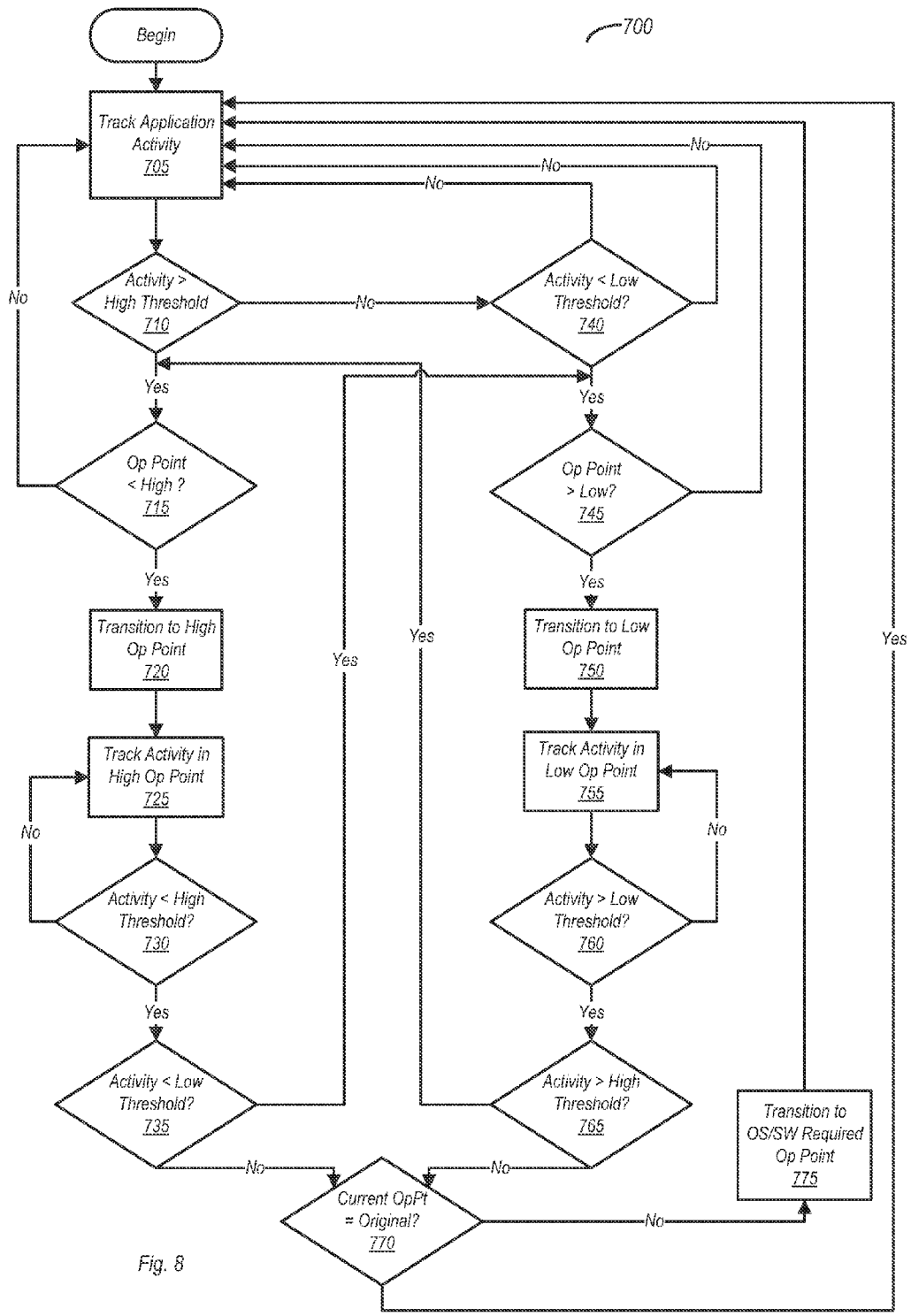
FIG. 8 is a flow diagram of one embodiment of a method for operating a power management unit.
Figure 9:
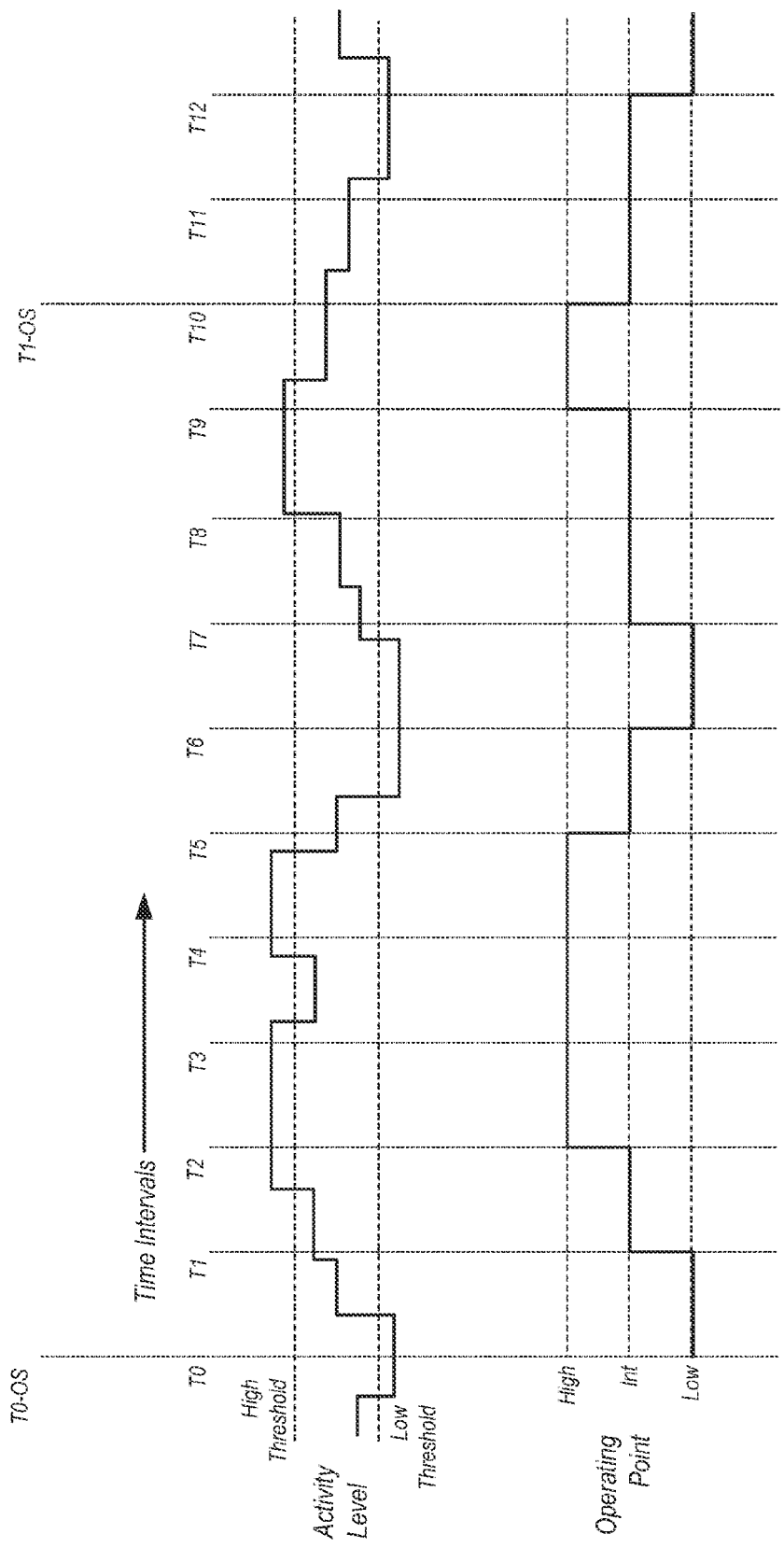
FIG. 9 is a diagram illustrating the operation of one embodiment of a method over a number of time intervals.

Method for Dynamic Performance Control:

FIGS. 8 and 9 illustrate methods by which various embodiments of the power management unit 20 discussed above may be operated. The method embodiments are described herein with reference to a single processing node. However, in accordance with the discussion above, it is noted that power management unit 20 may perform various embodiments of the method described herein concurrently for a number of different processing nodes.

FIG. 8 is a flow diagram of one embodiment of a method for operating a power management unit. In the embodiment shown, method 700 begins with the tracking of application activity in a processing node (block 705). The activity level may be compared to low and high thresholds. If the activity level exceeds the high threshold (block 710, yes) but the processing node is already operating at the high operating point (e.g., the highest P-state, P0; block 715, yes), then no change is made and the tracking of application activity continues (block 705).

If the activity level exceeds the high threshold (block 710, yes) and the operating point is less than the high operating point (block 715, yes), then the operating point of that processing node may be transitions to the high operating for at least the next time interval (block 720). After the transition to the new operating point, activity is tracked again (block 725). Operation of the processing node may continue at the high operating point if the activity level remains above the high threshold (block 730, no). If the activity level for the interval is less than the high threshold (block 730, yes) but remains above the low threshold (block 735, no) and the current operating point is not the same as the original operating point (block 770, no), then the processing node is transitioned to an intermediate operating point as required by the OS or other software (block 775).

If, in block 710, the activity level is less than the high threshold (block 710, no) and is greater than the low threshold (block 740, no), then the method returns to the tracking of application activity in block 705. If the activity level in block 740 is less than the low threshold (block 740, yes), and the operating point is at the low operating point (block 745, no), then the method again returns to the tracking of application activity in block 705. However, if the activity level in block 740 is less than the low threshold (block 740, yes), and the operating point is greater than the low operating point (block 745, yes), then the processing node is transitions to the low operating point (block 750). After transitioning to the low operating point, application activity is tracked (block 755) and if the activity level remains less than the low threshold (block 760, no) then the method returns to block 755 and the processing node remains and the operating point remains unchanged. However, if the activity level exceeds the low threshold (block 760, yes), but does not exceed the high threshold (block 765, no), then block 770 will result in a 'no' and the processing node will be transferred to an intermediate operating point as required by the operating system or other software.

If, in block 735, the activity level is less than the low threshold (block 735, yes), then the method may transition to block 745. If the processing node is operating at an operating point other than the low operating point (block 745, yes), it may be transitioned to the low operating point for at least the next time interval (block 750). Subsequent to this transition, the method may follow the sequence as described above from block 755 on. Otherwise, if the processing node is already operating at the low operating point (block 745, no), the method may return to block 705.

If, in block 765, the activity level is greater than the high threshold (block 765, yes), the method may transition to block 715. If the processing node is operating at an operating point other than the high operating point (block 715, yes), then it may be transitioned to the high operating point for at least the next time interval (block 720). Subsequent to this transition, the method may follow the sequence as described above from block 725 on. Otherwise, if the processing node is already operating at the high operating point (block 715, no), then the method may return to block 705.

FIG. 9 is a diagram illustrating the operation of one embodiment of a method over a number of time intervals. For the ease of illustration, the method is described with reference to only a single intermediate operating point. However, in accordance with the above (e.g., see Table 1), it is understood that embodiments are possible and contemplated wherein a number of intermediate operating points may be implemented. Further, as noted above, the example of FIG. 9 is made with reference to a single processing node, although it is understood that the described methodology can be performed concurrently for a number of unique processing nodes within the same electronic system.

At the point just prior to T0 in the example shown, the activity level for the processing node is less than the low threshold. Accordingly, for the first full time interval of the example, from T0 to T1, the operating point of the processing node is set to the low operating point. During this first interval, the activity level increases and remains at a point that is above the low threshold. Thus, for the next interval, T1 to T2, the operating point of the processing node is set to an intermediate operating point. During the interval T1 to T2, the activity level of the processing node increases to a point at which it exceeds the high threshold. Thus, for the interval of T2 to T3, the processing node is operated at the high operating point. The activity level remains above the high threshold throughout this interval, and thus the processing node remains in operation at the high operating point for the interval spanning T3 to T4.

In the interval between T3 and T4, the activity level drops below the high threshold for a portion of the interval before again rising to a point above the high threshold. Various events such as branch mispredictions, cache misses, interrupts, or other events that may cause a pipeline to be flushed or stall for other reasons may momentarily indicate a drop in processing throughput without necessarily indicating a drop in the processing workload itself. Accordingly, a power management unit configured to perform the method described herein may be configured to take into account such a situation. For example, instead of setting the operating point for a next interval based on the actual activity level at the end of the preceding interval, a power management unit may instead determine an average activity level over the immediate interval and one or more preceding intervals (e.g., such as the embodiment described above with reference to FIG. 5). Accordingly, events that may cause a momentary drop in processor throughput but otherwise do not indicate any reduced workload may be effectively filtered such that the operating point remains at its current level, or at the high point in this particular instance. Similarly, using an average activity level over the present and one or more preceding intervals may effectively filter out sudden bursts of activity for an otherwise low (e.g., memory-bounded) workload. Using such techniques may allow a power management unit as described herein to more effectively match the operating point to the processor workload while preventing anomalous events from affecting the operating point.

For the intervals beginning with T4, the activity level falls and rises again a number of times, with the operating point following. As previously noted, the intervals may be short in duration. In one embodiment, the intervals may range from 10 microseconds to 100 microseconds, although intervals of others durations (including those of a duration shorter than 10 microseconds) are possible and contemplated. Utilizing short intervals may allow the operating point of a processing node to closely reflect its corresponding activity level. This may prevent a processing node from being maintained at the highest operating point for a significant time after a compute-bounded workload has been completed, or at the lowest operating point for a significant time subsequent to an increase in workload demand.

FIG. 9 also illustrates one of a plurality of intervals of a second duration, T0-OS to T1-OS. It is noted that the number of the first intervals T0-T10 to the number of second intervals as shown here is exemplary, and the ratio of first intervals to second intervals may vary. The exemplary one of the second intervals illustrated here may be an interval over which operating system software may monitor the activity levels of a processing node. These intervals may be significantly longer in duration than the first intervals, and in some cases, one or more orders of magnitude longer. The operating system may monitor the activity level over these second intervals and may adjust the operating point accordingly. However, the various embodiments of a power management unit discussed herein may retain control of the operating point for each processing node when the activity level is greater than or equal to the high activity threshold, or less than or equal to the low activity threshold. For activity levels falling between these two threshold values, the power management unit may enable the operating system to set the operating point for each processing node (or processor core) of the processor. However, the power management unit may override the operating point selection made by the operating system at any time during one of the second intervals if, during a first interval, an activity level is detected that is greater than or equal to the high activity threshold or less than or equal to the low activity threshold.

Figure 10:
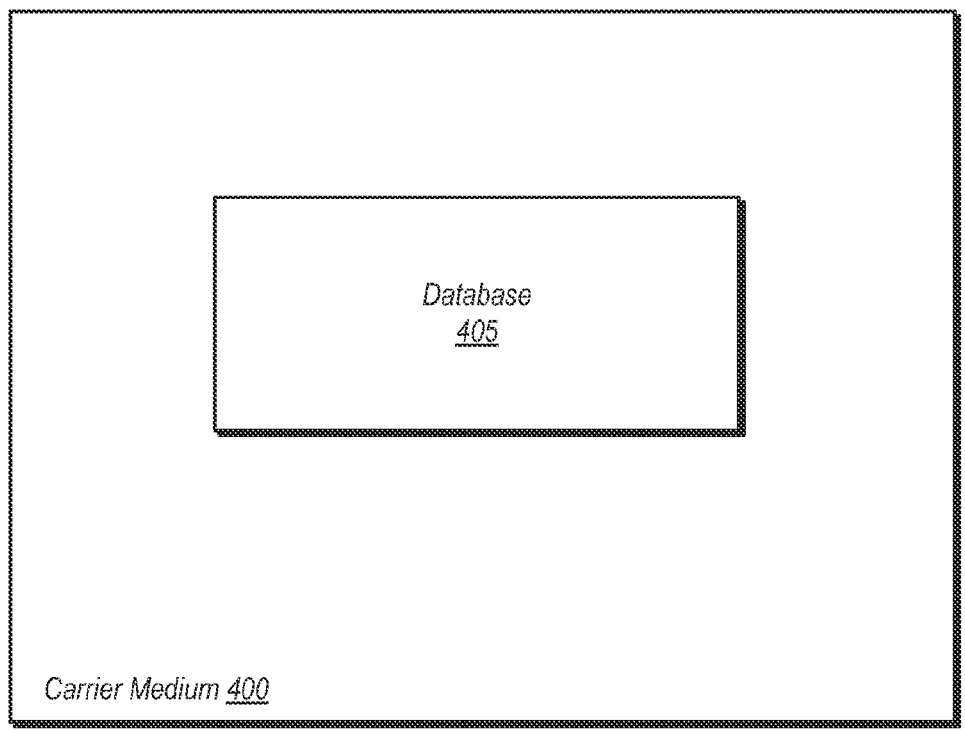
FIG. 10 is a block diagram of one embodiment of a computer readable medium including a data structure describing an embodiment of circuitry including a power management unit.

Computer Accessible Storage Medium:

Turning next to FIG. 10, a block diagram of a computer accessible storage medium 400 including a database 405 representative of the system 10 is shown. Generally speaking, a computer accessible storage medium 400 may include any non-transitory storage media accessible by a computer during use to provide instructions and/or data to the computer. For example, a computer accessible storage medium 400 may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Generally, the database 405 of the system 10 carried on the computer accessible storage medium 400 may be a database or other data structure which can be read by a program and used, directly or indirectly, to fabricate the hardware comprising the system 10. For example, the database 405 may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the system 10. The netlist may then be placed and routed to produce a data set describing geometric shapes to be applied to masks. The masks may then be used in various semiconductor fabrication steps to produce a semiconductor circuit or circuits corresponding to the system 10. Alternatively, the database 405 on the computer accessible storage medium 400 may be the netlist (with or without the synthesis library) or the data set, as desired.

While the computer accessible storage medium 400 carries a representation of the system 10, other embodiments may carry a representation of any portion of the system 10, as desired, including IC 2, any set of agents (e.g., processing nodes 11, I/O interface 13, power management unit 20, etc.) or portions of agents (e.g., activity monitor 202, CIPS unit 204, etc.).

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A system comprising:
   a processing node; and
   a power management circuit configured to, for each of a plurality of first time intervals, monitor an activity level of the processing node and further configured to:

cause the processing node to operate, independent of operating system software, at a predefined high operating point of a plurality of operating points during at least one successive first time interval if the activity level in a given first time interval is greater than a high activity threshold; and cause the processing node to operate, independent of operating system software, at a predefined low operating point of the plurality of operating points for the at least one successive first time interval if the activity level in the given first time interval is less than a low activity threshold;

wherein each of the plurality of operating points comprises an operating voltage and a clock frequency, and wherein the predefined high operating point is a highest one of the plurality of operating points, wherein the predefined low operating point is a lowest non-idle one of the plurality of operating points, and wherein each of the one or more intermediate operating points is lower than the predefined high operating point and higher than the predefined low operating point.

2. The system as recited in claim 1, wherein the power management circuit is configured to change at least one of the operating voltage and the clock frequency when changing the operating point of the processing node.

3. The system as recited in claim 1, wherein the clock frequency when operating at a highest operating point is greater than the clock frequency when operating in any of the other ones of the plurality of operating points, and wherein the clock frequency when operating at a lowest non-idle operating point is less than the clock frequency when operating in any one of the other ones of the plurality of operating points, and wherein the clock frequency at the lowest non-idle operating point is greater than zero.

4. The system as recited in claim 1, wherein the power management circuit is further configured to compare the respective activity levels to the high activity threshold and to the low activity threshold for each of two or more processing nodes, wherein of the two or more processing nodes are each configured to operate at respective operating points independently of one another.

5. The system as recited in claim 1, wherein the high activity threshold is based on a first threshold value and a first hysteresis value, and wherein the low activity threshold is based on a second threshold value and a second hysteresis value.

6. The system as recited in claim 1, wherein the power management unit is further configured to enable operating system software to cause the processing node to operate at one of one or more predefined intermediate operating points of the plurality of operating points for the at least one successive first time interval if the activity level is between the low activity threshold and the high activity threshold, wherein the operating system software is configured to monitor the activity level of the processing node for each of a plurality of second time intervals, wherein a duration of each of the second time intervals is at least one order of magnitude greater than a duration of each of the first time intervals.

7. The system as recited in claim 1, wherein the power management is configured to:

increment a counter responsive to each indication of a retired instruction received from the processing node in a given one of the plurality of first time intervals;

decrement a counter responsive to determining that a number of instruction retirements for the given one of the plurality of first time intervals is less than or equal to an expected number of instruction retirements; and compare a count value provided by the counter at the end of the given one of the plurality of first time interval to the high and low activity thresholds.

8. The system as recited in claim 1, wherein the power management circuit is configured to:

determine a moving average of activity of the processing node over a given first time interval; and compare the moving average of activity to the high activity threshold and the low activity threshold.

9. The system as recited in claim 1, wherein the power management circuit is configured to determine a number of instructions per cycle executed by the processing node, and further configured to compare the number of instructions per cycle to the high activity threshold and the low activity threshold.

10. A method comprising:

for each of a plurality of first time intervals, determining an activity level of a processing node;

a power management circuit causing the processing node to operate, independently of operating system software, at a predefined high operating point of a plurality of operating points in at least one successive first time interval if the activity level exceeds a high activity threshold;

the power management circuit causing the processing node to operate, independently of operating system software, at a predefined low operating point of the plurality of operating points in the at least one successive first time interval if the activity level is less than the low activity threshold; and the operating system software causing the processing node to operate at one of one or more predefined intermediate operating points of the plurality of operating points for the at least one successive first time interval if the activity level is between the low activity threshold and the high activity threshold.

11. The method as recited in claim 10, wherein each of the plurality of operating points comprises an operating voltage and a clock frequency, and wherein the predefined high operating point is a highest one of the plurality of operating points, wherein the predefined low operating point is a lowest non-idle one of the plurality of operating points, and wherein each of the one or more intermediate operating points is lower than the predefined high operating point and higher than the predefined low operating point.

12. The method as recited in claim 10, further comprising the power management circuit comparing the respective activity levels to the high activity threshold and to the low activity threshold for each of two or more processing nodes, wherein of the two or more processing nodes are each configured to operate at respective operating points independently of one another.

13. The method as recited in claim 10, wherein the high activity threshold is based on a first threshold value and a first hysteresis value, and wherein the low activity threshold is based on a second threshold value and a second hysteresis value.

14. The method as recited in claim 10, wherein the operating system software is configured to monitor the activity level of the processing node for each of a plurality of second time intervals, wherein a duration of each of the second time intervals is at least one order of magnitude greater than a duration of each of the first time intervals.

15. The method as recited in claim 11, further comprising the power management circuit changing at least one of the operating voltage and the clock frequency when changing the operating point of the processing node.

16. A processor comprising:

a plurality of processor cores; and a power management circuit configured to, for each of a plurality of first time intervals, monitor respective activity levels for each of the plurality of processor cores, and further configured to:

cause each processor core to operate, independent of operating system software, at a predefined high operating point of a plurality of operating points during at least one successive first time interval if the activity level in a given first time interval for that processor core is greater than a high activity threshold; and cause each processor core to operate, independent of operating system software, at a predefined low operating point of the plurality of operating points for the at least one successive first time interval if the activity level in the given first time interval for that processor core is less than a low activity threshold;

wherein each of the plurality of operating points comprises an operating voltage and a clock frequency, and wherein the predefined high operating point is a highest one of the plurality of operating points, wherein the predefined low operating point is a lowest non-idle one of the plurality of operating points, and wherein each of the one or more intermediate operating points is lower than the predefined high operating point and higher than the redefined low operating point.

17. The processor as recited in claim 16, wherein the power management unit is further configured to enable operating system software to cause each of the processor cores to operate at one of one or more predefined intermediate operating points of the plurality of operating points for the at least one successive first time interval if the activity level for that processor core is between the low activity threshold and the high activity threshold, wherein the operating system software is configured to monitor the activity level of each of the processor cores for each of a plurality of second time intervals, wherein a duration of each of the second time intervals is at least one order of magnitude greater than a duration of each of the first time intervals.

\* \* \* \* \*